US009864931B2

(12) United States Patent
Kumar et al.

(10) Patent No.: US 9,864,931 B2
(45) Date of Patent: Jan. 9, 2018

(54) TARGET DOMAIN CHARACTERIZATION FOR DATA AUGMENTATION

(71) Applicant: Xerox Corporation, Norwalk, CT (US)

(72) Inventors: Jayant Kumar, San Jose, CA (US); Beilei Xu, Penfield, NY (US); Peter Paul, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/097,791

(22) Filed: Apr. 13, 2016

(65) Prior Publication Data

US 2017/0300783 A1    Oct. 19, 2017

(51) Int. Cl.
 G06K 9/62    (2006.01)

(52) U.S. Cl.
 CPC ......... G06K 9/6245 (2013.01); G06K 9/6227 (2013.01); G06K 9/6259 (2013.01)

(58) Field of Classification Search
 None
 See application file for complete search history.

(56) References Cited

U.S. PATENT DOCUMENTS

| | | | | | |
|---|---|---|---|---|---|
| 5,828,793 A | * | 10/1998 | Mann | ...................... | G06T 5/007 348/222.1 |
| 5,926,568 A | * | 7/1999 | Chaney | ................ | G06K 9/6206 382/128 |
| 6,124,864 A | * | 9/2000 | Madden | .................. | G06T 17/00 345/420 |
| 6,650,778 B1 | * | 11/2003 | Matsugu | ............ | G06K 9/00362 382/190 |
| 6,714,665 B1 | * | 3/2004 | Hanna | ...................... | G06K 9/00 382/106 |
| 6,868,190 B1 | * | 3/2005 | Morton | .................. | H04N 5/262 348/208.13 |
| 7,751,602 B2 | * | 7/2010 | Collins | ............... | G06F 19/3443 382/128 |
| 7,904,187 B2 | * | 3/2011 | Hoffberg | ................ | G05B 15/02 370/200 |
| 8,200,025 B2 | | 6/2012 | Woodbeck | | |
| 8,213,737 B2 | * | 7/2012 | Steinberg | ........... | G06K 9/00248 382/254 |
| 8,363,957 B2 | | 1/2013 | He et al. | | |
| 8,660,317 B2 | | 2/2014 | Li et al. | | |
| 8,682,097 B2 | * | 3/2014 | Steinberg | .................. | G06T 5/50 382/275 |
| 8,687,851 B2 | | 4/2014 | Hua et al. | | |

(Continued)

OTHER PUBLICATIONS

Krizhevsky A., et al., "ImageNet Classification with Deep Convolutional Neural Networks," Advances in Neural Information Processing Systems (2012) 9 pages.

(Continued)

*Primary Examiner* — Tsung-Yin Tsai
(74) *Attorney, Agent, or Firm* — Kermit D. Lopez; Luis M. Ortiz; Ortiz & Lopez, PLLC

(57) ABSTRACT

Methods, systems, and processor-readable media for training data augmentation. A source domain and a target domain are provided, and thereafter an operation is performed to augment data in the source domain with transformations utilizing characteristics learned from the target domain. The augmented data is then used to improve image classification accuracy in a new domain.

18 Claims, 4 Drawing Sheets

(56) References Cited

U.S. PATENT DOCUMENTS

| | | |
|---|---|---|
| 8,903,167 B2 | 12/2014 | Kohli et al. |
| 9,038,172 B2 | 5/2015 | Miller et al. |
| 9,111,138 B2 | 8/2015 | Paul et al. |
| 9,141,885 B2 | 9/2015 | Yang et al. |
| 9,202,118 B2 | 12/2015 | Wang et al. |
| 9,230,192 B2 | 1/2016 | Jin et al. |
| 2002/0126915 A1* | 9/2002 | Lai .................... G06T 7/001 382/296 |
| 2008/0240558 A1* | 10/2008 | Li ...................... H04N 1/00045 382/167 |
| 2008/0270478 A1* | 10/2008 | Liu .................. G06F 17/30247 |
| 2009/0062641 A1* | 3/2009 | Barbu .................... A61B 34/20 600/424 |
| 2010/0290708 A1* | 11/2010 | Magai .................. G06K 9/6211 382/195 |
| 2011/0026832 A1* | 2/2011 | LeMoigne-Stewart ............................ G06K 9/4633 382/199 |
| 2012/0219211 A1* | 8/2012 | Ding .................... G06K 9/4642 382/159 |
| 2013/0148904 A1 | 6/2013 | Wang et al. |
| 2013/0185001 A1 | 7/2013 | Cardoso et al. |
| 2014/0363051 A1 | 12/2014 | Burry et al. |
| 2015/0049955 A1* | 2/2015 | Stoeffler .............. G06K 9/6202 382/220 |
| 2015/0279036 A1 | 10/2015 | Artan et al. |
| 2015/0324653 A1 | 11/2015 | Xu et al. |
| 2015/0334380 A1* | 11/2015 | Kim .................. H04N 13/0425 348/54 |

OTHER PUBLICATIONS

Histogram matching—Wikipedia, the free encyclopedia, printed Mar. 25, 2016, 2 pages.

Duan, L. et al., "Learning with Augmented Features for Heterogeneous Domain Adaptation," International Conference on Machine Learning (2012) 8 pages.

* cited by examiner

TARGET DOMAIN CHARACTERIZATION FOR DATA AUGMENTATION

TECHNICAL FIELD

Embodiments are generally related to the field of image-processing and video-based detection. Embodiments are also related to image classification and data augmentation.

BACKGROUND

Learning an accurate image classification model requires large collections of manually annotated training examples. This requirement is even more stringent for deep learning methods, which have been shown as the state-of-the-art in multi-class image classification tasks. Moreover, when the same manual annotation process has to be repeated over and over again across multiple domains (e.g., different testing sites, different types of cameras, etc.), the substantial time and effort to manually annotate a large set of training examples for every instance can result in excessive operational cost and overhead. One important step in training such data hungry systems is to augment the data with various transformations such as cropping, flipping, etc., of the given labelled data. In some applications, however, the target domain where these models are applied have different characteristics than the given images and the augmented data. Hence, these transformations are not so useful and the performance in new domain is not satisfactory.

Domain adaptation of statistical classifiers is an important problem that arises when the data distribution in the new domain is different from that in the training domain. In many real-world classification problems, it is necessary to adapt the models to new domains. For example, binary classifiers for vehicle passenger detection trained with data from one site needs to have consistent performance across multiple sites. However, due to many uncontrollable reasons, such as the slight variations in setting up the image acquisition systems (e.g., camera angles with respect to the vehicles) or the inherent differences from site to site (e.g., traffic patterns with respect to the sun), the images collected from each site can vary greatly in terms of contrast, size of ROI's, and the locations of the human heads, etc. Hence, a classifier trained with images collected from one site often cannot achieve the same performance with images from another site. The classifier has to be either retrained from scratch or modified/fine-tuned to a new domain with only a few training examples from the new domain.

Recently, deep learning architectures have been shown to outperform all previous combination of handcrafted features and shallow classifiers for image classification tasks. However, deep learning approaches rely heavily on the amount of labeled images available. The effort and cost associated with manually labeling a large amount of images for training a CNN (Convolutional Neural Network) is impractical for many applications. Hence, there is a strong desire to investigate/develop approaches for domain adaptation, especially when only a small set of unlabeled images from the new domain is available.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image classification methods, systems, and processor-readable media.

It is another aspect of the disclosed embodiments to provide for training data augmentation methods, systems, and processor-readable media.

It is yet another aspect of the disclosed embodiments to augment training data in one domain (e.g., a source domain) utilizing unlabeled images from a different domain (e.g., a target domain).

The aforementioned aspects and other objectives and advantages can now be achieved as described herein. Methods, systems, and processor-readable media for training data augmentation are disclosed. A source domain and a target, domain are provided, and thereafter an operation is performed to augment data in the source domain with transformations utilizing characteristics learned from the target domain. The augmented data is then used to improve image classification accuracy in a new domain.

Example embodiments are disclosed for transforming and augmenting training images utilizing unlabeled images from the new domain. Such embodiments are useful in obtaining classification models, which are capable of performing well across multiple domains. Different types of transformations can be applied to the source domain training images in order to create a new set of images to train a classifier for a target domain. Images can be characterized in other domains to transform the source domain training images for data augmentation. The image characteristics are first analyzed and the settings of the source and target domain images captured. Because transforming all images using the same set of parameters may not be optimal for data augmentation, parameters can be obtained for each individual image and apply the transformations.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
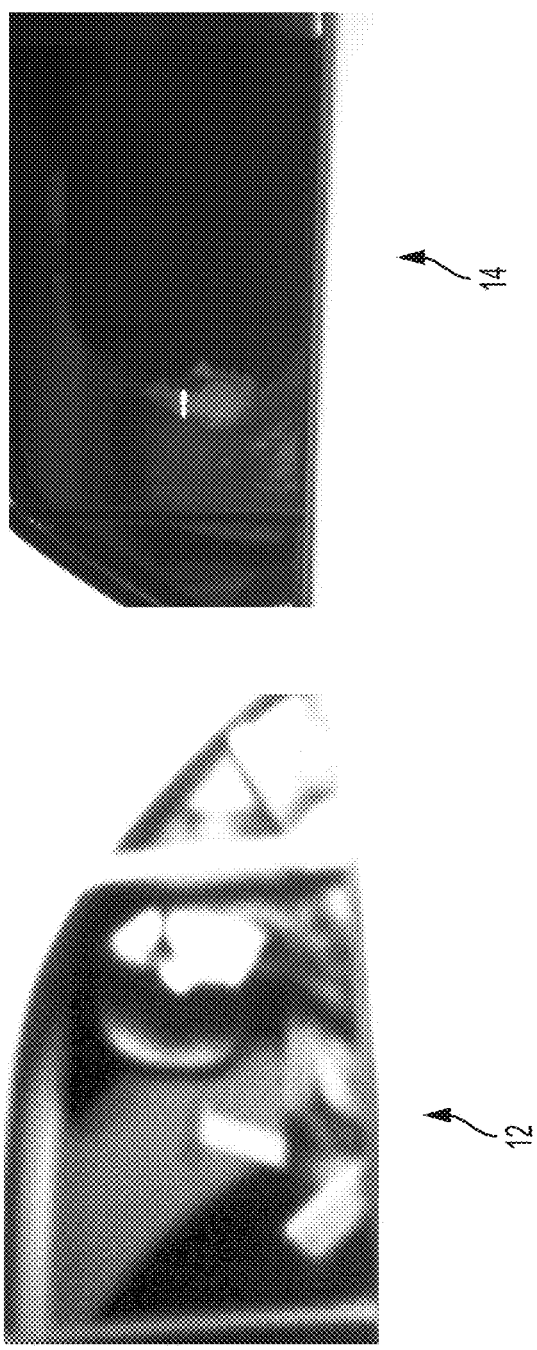
FIG. 1 illustrates a sample image from a source domain and a sample image from a new domain, in accordance with an example embodiment.

FIG. 1 illustrates a sample image 12 from a source domain and a sample image 14 from a new domain, in accordance with an example embodiment. FIG. 1 shows the sample image 12 from the source domain where labeled data is available. Training can be accomplished using such images. The sample image 14 is from a new domain where a trained model is applied. Note the different image characteristics in the two images 12, 14, for example, different level of noise and blur, shift in intensities change in direction. The disclosed approach can propose characterized images in the new domain to augment data in the source domain.

The disclosed approach can be utilized to transform and augment training images using unlabeled images from a new domain. This approach is useful in obtaining classification models, which perform well across multiple domains. Different types of transformations can be applied to the source domain training images in order to create a new set of images to train a classifier for a target domain. Researchers have applied, for example, generic geometric and photometric transformations, which make use of only source domain data. The disclosed approach, however, was developed to characterize images in other domains to transform the source domain training images for data augmentation. First, the image characteristics are analyzed and settings of the source and target domain images are captured. Transforming all images using the same set of parameters may not be optimal for data augmentation. Therefore, parameters can be obtained for each individual image or an image subset of images and an operation then performed to apply the transformations. FIG. 1 thus shows the sample images 12, 14 from source and target domains, respectively.

In an example embodiment, various modules can be implemented. For example, a module (or modules) for identifying types of transformation between source and target domains through manual/visual/known setup differences and/or an automated process can be implemented. A number of different types of transformations are considered. For example, geometric transformations can include rotation, scaling, and flipping based on the direction of traffic in other domains. An example scenario may involve comparing identified landmark points for each window type (e.g., side-windows), and then the amount of rotation and scaling can be determined. This can be accomplished in a training phase when a deformable part model (DPM) for windshield detection is trained or modified from site to site. Examples of geometric transformations include affine and composite affine transformations including rotation, reflection, scaling, and projective transformation, etc., and photometric transformations such as histogram matching, contrast enhancement, etc.

Resolution conversion is also considered including high-resolution to low-resolution and vice versa. An example of such resolution conversion data includes properties of the cameras used at different sites. Photometric transformations are also considered such as, for example, contrast change, intensity clipping, and histogram matching. Examples of photometric transformations include estimating the intensity/contrast difference of a common type of object (e.g., road surface road surface/white car, etc.) in the images captured from the source and target domains, and comparing image histograms of the source and target domain. Other nuisances are also considered, such as noise and blur characteristics. For example, a noise level can often be estimated from smoothed areas in images, for example, a body surface of a car. Note that this step only requires a set of training examples from the target domain; the training samples can be labeled or unlabeled.

Another module involves transforming source domain training images to match the characteristics of images from the target domain. It is impractical and impossible to apply a transformation to the source domain images to match every image in the target domain. Hence, in an example embodiment, K-means clustering and Euclidian distance based matching operations can be implemented to determine a set of transformation parameters for each type of transformation. For example, for histogram, matching, K-means clustering can be applied to the histograms from a set of training, examples from the target domain. Using K-means clustering, N representative histograms can be found from the target domain. N is selected based on computational cost and the statistical distribution of image histograms from the target domain. A large variation of histograms requires a large value of N while a large N adds computational costs when the transformation is applied. For each source domain image, either all N histogram matching can be applied (i.e., each training image will generate N new images) or its distance to the cluster centers can determine a subset. Each training image can then be matched to cluster centers of the target domain in order to find a very specific set of parameters to transform that image.

An additional module can be implemented, which involves training a model utilizing the source domain, and then fine-tuning with transformed data based on previous steps. In some example embodiments having shallow architectures, which have only one or two layers, both training and augmented data can be used to train the system jointly.

Figure 2:
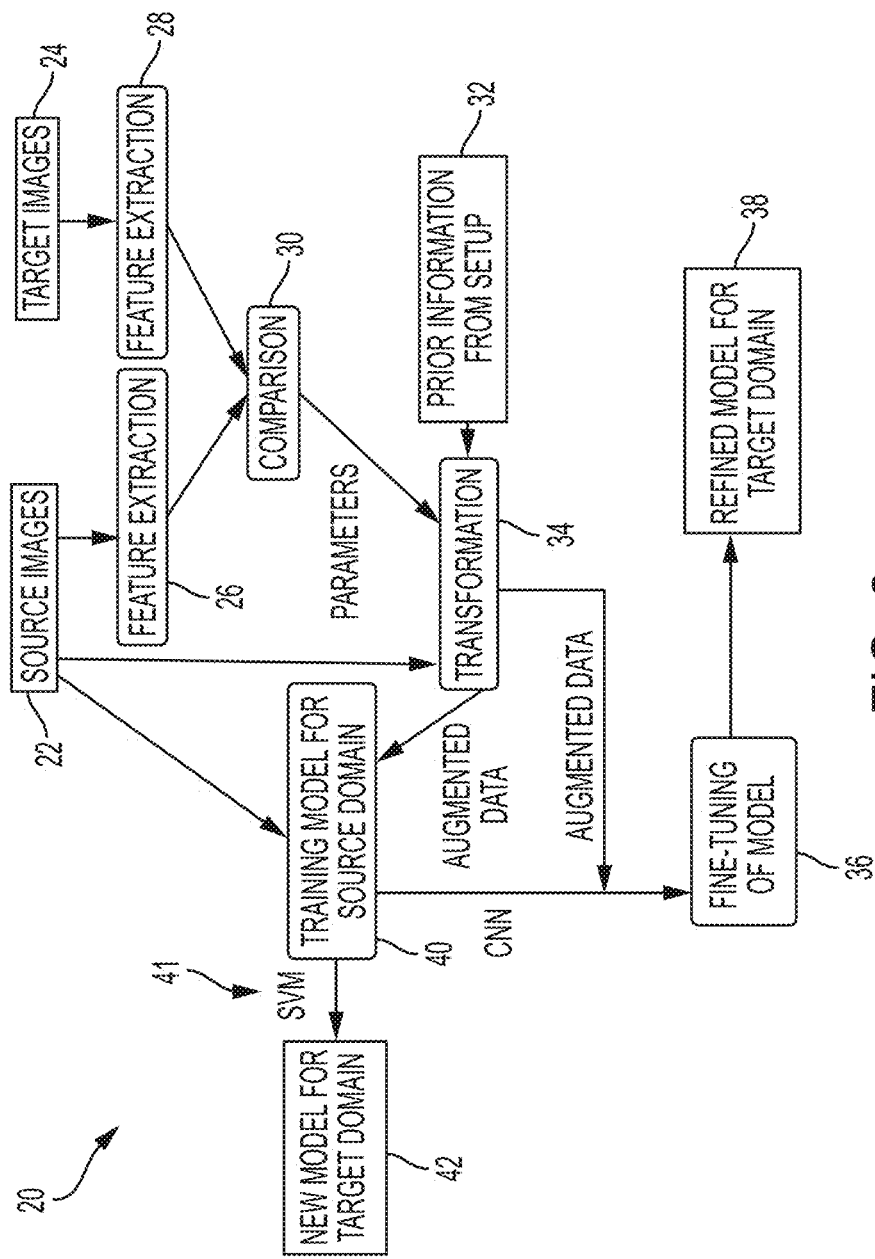
FIG. 2 illustrates a flow diagram depicting a method of data augmentation, which can be implemented in accordance with an example embodiment.

FIG. 2 illustrates a flow diagram depicting a method 20 of data augmentation, which can be implemented in accordance with an example embodiment. The method 20 can implement steps or operations for feature extraction, as shown, for example, at blocks 26 and 28. The feature extraction operation shown at block 26 can be implemented with respect to one or more source images 22, and the feature extraction operation depicted at block 28 can be implemented with respect to the target images 24. A comparison operation can then be implemented, as shown at block 30, with respect to the data output as a result of the feature extraction operations depicted at blocks 26 and 28. With respect to the aforementioned target images 24, note that this set of target-domain images does not have to be labeled and usually is a smaller dataset than what is needed if it is desired to train a complete new model from target-domain images only.

Thereafter, a transformation operation, as shown at block 34, can be implemented with respect to the source images 22 and includes the user of parameters generated as a result of the comparison operation shown at block 30. Prior information from the setup can also be utilized, as shown at block 32, as part of the transformation operation depicted at block 34. As a result of the transformation operation shown at block 34, augmented data can be utilized with the training model for the source domain, as indicated at block 40 and also for fining tuning of the model, as shown at block 36. Following processing of the fine-tuning operation depicted at block 36, the refined model for the target domain can be generated, as depicted at block 38. Note that the source image(s) 22 can also be supplied for use by the training model as depicted at block 40. An SVM (Support Vector Machine) can then be generated, as indicated by arrow 41 and supplied to the new model for the target domain, as illustrated at block 42.

The approach depicted in FIG. 2 offers unique features, such as, the usage of target domain unlabeled data, characterizing the target domain images by clustering and other analysis for association, identifying the suitable transformations, and augmenting each individual source domain training image. This approach incorporates the new domain information at a very early stage by augmenting the training data through synthesizing new images on the image level.

The method 20 shown in FIG. 2 can be utilized to augment training data in one domain (e.g., source domain) utilizing unlabeled images from a different domain (e.g., target domain). Classifiers trained with such augmented data can lead to better performance across multiple domains. The data augmentation is achieved via first identifying types of transformations between the source and target domains and then transforming the source domain training images to match the characteristics of target domain images. Benefits of this approach include, for example, reduced labeling costs and improved classification performance across different sites.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, IEEE 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 3:
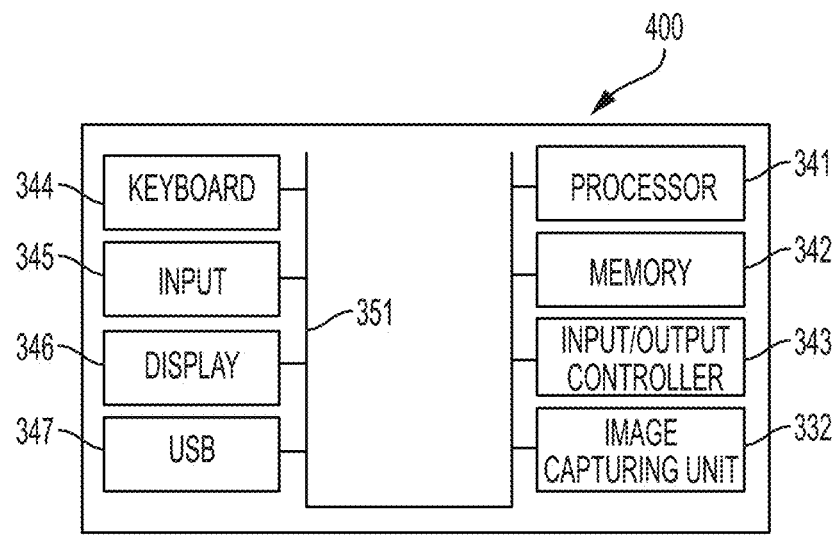
FIG. 3 illustrates a system of a data-processing apparatus or system that can be utilized to implement instructions for target domain characterization for data augmentation, in accordance with an example embodiment.
Figure 4:
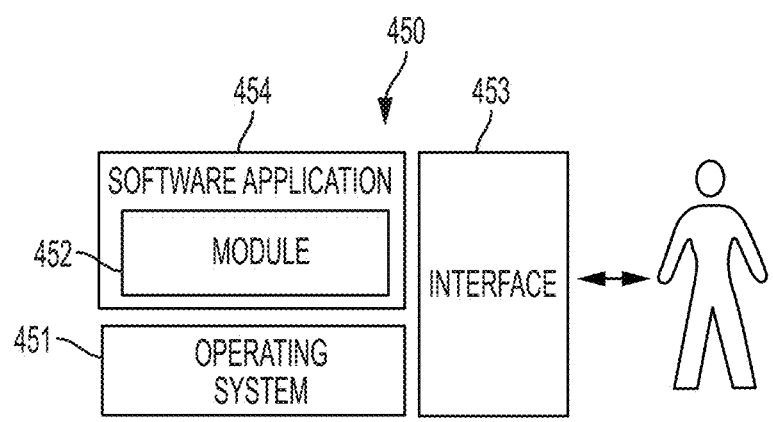
FIG. 4 illustrates a schematic view of a software system including a module, an operating system, and a user interface, in accordance with an example embodiment.

FIGS. 3-4 are provided as exemplary diagrams of data-processing environments in which embodiments may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 3, some embodiments may be implemented in the context of a data-processing system 400 that can include one or more processors such as processor 341, a memory 342, a controller 343 (e.g., an input/output controller), a peripheral USB (Universal Serial Bus) connection 347, a keyboard 344 (e.g., a physical keyboard or a touch screen graphically displayed keyboard), an input component 345 (e.g., a pointing device, such as a mouse, track ball, pen device, which may be utilized in association or with the keyboard 344, etc.), a display 346, and in some cases, an image-capturing unit 332 (e.g., a digital video camera, an ALPR camera, etc.). Data-processing system 400 may be, for example, a client computing device (e.g., a client PC, laptop, tablet computing device, etc.), which communicates with peripheral devices (not shown) via a client-server network (e.g., wireless and/or wired). In another embodiment, the data-processing system may be a server in the context of a client-server net cork or other server-based network implementation.

As illustrated, the various components of data-processing system 400 can communicate electronically through a system bus 35 or other similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a pad computing device, a server, and so on.

FIG. 4 illustrates a computer software system 450 for directing the operation of the data-processing system 400 shown in FIG. 3. A software application 454 is stored, for example, in memory 342. The computer software system 450 generally includes the software application 454, a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as, for example, a module 452 (or a module composed of a group of modules), which can, for example, implement instructions or operations such as those described herein. Examples of instructions that can be implemented by module 452 include steps or operations such as those shown and described herein with respect to the various blocks and operations shown in FIG. 2 and described elsewhere herein.

The following discussion is intended to provide a brief, general description of suitable computing environments in which the system and method may be implemented. Although not required, the disclosed embodiments will be described in the general context of computer-executable instructions, such as program modules being executed by a single computer. In most instances, a "module" such as module 452 shown in FIG. 4 constitutes a software application. However, a module may also be composed of, for example, electronic and/or computer hardware or such hardware in combination with software. In some cases, a "module" can also constitute a database and/or electronic hardware and software that interact with such a database.

Generally, program modules include, hut are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those shown in FIG. 2, for example, and discussed elsewhere herein can be implemented in the context of such a module or modules, sub-modules, and so on. Examples of such modules are also shown in FIG. 5.

FIGS. 3-4 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Figure 5:
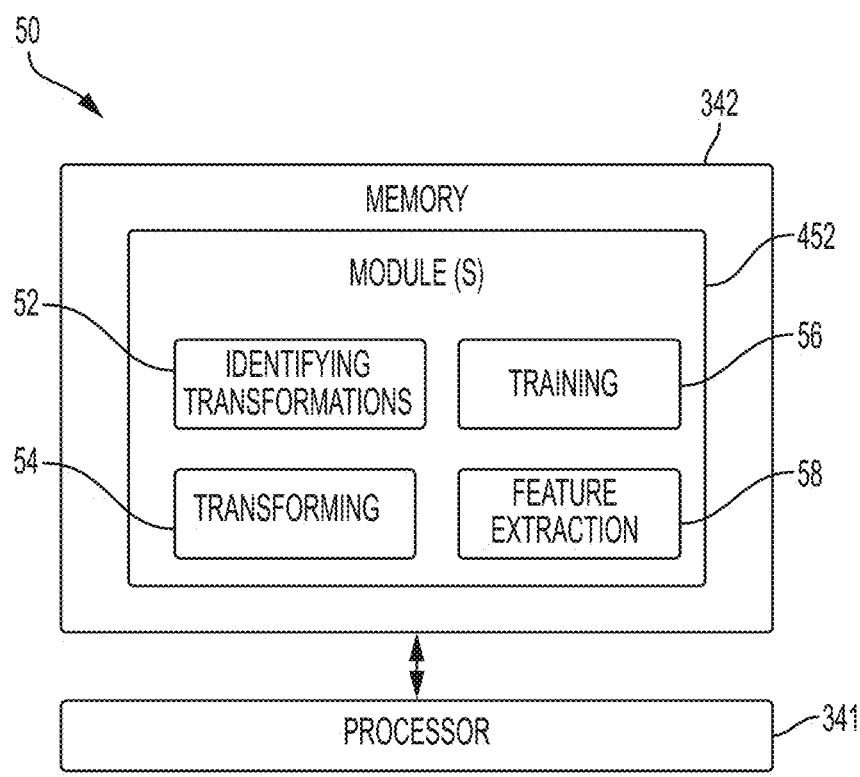
FIG. 5 illustrates a system for target domain characterization for data augmentation, which can be implemented in accordance with an example embodiment.

FIG. 5 illustrates a system 50 for target domain characterization for data augmentation, which can be implemented in accordance with an example embodiment. In the example embodiment shown in FIG. 5, system 50 includes processor 341 and memory 342, which are also shown in FIG. 3. The module 452 contains one or more modules including (but not limited to), for example, modules 52, 54, 56 and 58. Module 52 can include instructions for identifying types of transformation between source and target domains through manual/visual/known setup differences and/or an automated process. Module 52 can be configured to include instructions addressing different types of transformation including, but not limited to, geometric transformations (e.g., rotation, scaling, flipping based on the direction of traffic in other domains, etc.), resolution conversion (e.g., high-resolution to low-resolution and vice versa), photometric transformations (e.g., contrast change, intensity clipping, histogram matching, etc.), and other nuisances (e.g., noise and blur characteristics). Note that the aforementioned automated process can involve, for example, 1) defining a difference metric such as a distance measure between two histograms for photometric difference, the size/orientation/shape differences between two ROIs for geometric difference, or image blur by comparing edge sharpness; and 2) if the value of the defined metric is greater than a predefined threshold, determining that the two image are different.

The module 52 requires a set of training examples from the target domain and the training samples can be labeled or unlabeled.

Module 54 can include instructions for transforming source domain training images to match the characteristics of images from the target domain. As indicated previously, it is impractical and impossible to apply a transformation to the source domain images to match every image in the target domain. Thus, in some embodiments, module 54 can employ K-means clustering and a Euclidian distance based matching to determine a set of transformation parameters for each type of transformation. K-means clustering is a method of vector quantization, which can be utilized to partition, for example, n observations into k clusters in which each observation belongs to the cluster with the nearest meaning, serving as a prototype of the cluster.

For histogram matching, for example, K-means clustering of the histograms can be applied from a set of training examples from the target domain. Using K-means clustering, N representative histograms can be found from the target domain. N is selected based on computational cost and the statistical distribution of image histograms from the target domain. Large variations in the histograms require a large value of N while a large N will add computational cost when we apply the transformation. For each of the source domain image, either all N histogram matching can be applied, i.e., each training image will generate N new images or a subset determined by its distance to the cluster centers. Each training image can then be matched to cluster centers of the target domain, to find a very specific set of parameters to transform that image.

Module 56 can include instructions for training a model using the source domain, and then fine-tuning the model with transformed data based on previous operations. For shallow architectures which have only one or two layers, both training and augmented data can be used to train the system jointly. Module 58 can be implemented as a feature extraction module that performs feature extraction instructions such as the feature extraction operations depicted at blocks 26 and 28 of FIG. 2.

Based on the foregoing, it can be appreciated that a number of embodiments are disclosed. For example, in one embodiment, a method (e.g., a computer-implemented method) can be implemented for training data augmentation. Such a method can include steps or logical operations such as, for example, providing a source domain and a target domain, augmenting data in the source domain with transformations utilizing characteristics learned from the target domain, and employing augmented data from the source domain transformations to improve image classification accuracy in the target domain or a new domain. Note that embodiments are not necessarily restricted to the target domain. That is, the re-trained model does not have to be applied to the specific target domain only. It can be applied to other domains (e.g., a "new" domain) with image characteristics similar to the target domain.

In some example embodiments, the aforementioned characteristics can include image characteristics such as a geometric transformation and a photometric transformation. That is, the types of image characteristics utilized to compare the source and target domains can include, for example, geometric, photometric, and other characteristics such as discussed previously herein.

In another example embodiment, a step or operation can be implemented for determining at least one representative property of the target domain and the source domain utilizing k-means clustering of at least one histogram. In another example embodiment, steps or operations can be provided for deriving source images from the source domain and target images from the target domain, subjecting the source images and the target images to feature extraction operations, and comparing results of the feature extraction operation and including the results with the transformations for augmenting the data in the source domain. In another example embodiment, comparing results can be based on a visual examination and/or an automated process (e.g., histogram matching).

In another example embodiment, steps or operations can be provided for training a model for the source domain with the augmented data, fine-tuning the model to derive a refined model for the target domain, and/or deriving a new model for the target domain after training the model for the source domain with the augmented data.

In yet another example embodiment, a system can be provided for training data augmentation. Such a system can include, for example, at least one processor and a computer-usable medium embodying computer program code. The computer-usable medium is capable of communicating with the at least one processor. The computer program code can include instructions executable by the at least one processor and configured, for example, for providing a source domain and a target domain, augmenting data in the source domain with transformations utilizing characteristics learned from the target domain, and employing augmented data from the source domain transformations to improve image classification accuracy in the target domain or a new domain.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for training data augmentation, said method comprising:
   providing a source domain and a target domain;
   augmenting data in said source domain with transformations utilizing characteristics learned from said target domain wherein said characteristics include unlabeled images from said target domain;
   employing augmented data from said source domain to said transformations to improve image classification accuracy in said target domain or a new domain; and
   determining at least one representative property of said target domain and said source domain utilizing an average of one property from a set of images and wherein said photometric transformation comprises an intensity clipping.

2. The method of claim 1 wherein said characteristics include image characteristics comprising: a geometric transformation, a photometric transformation, a resolution conversion, and nuisance transformations.

3. The method of claim 2 further comprising:
   deriving source images from said source domain and target images from said target domain;
   subjecting said source images and said target images to feature extraction operations; and
   comparing results of said feature extraction operation and including said results with said transformations for augmenting said data in said source domain and wherein said resolution conversion comprises a high-resolution to a low-resolution and vice versa.

4. The method of claim 3 wherein said comparing said results further comprises comparing based on at least one of a visual examination and/or an automated process.

5. The method of claim 3 further comprising:
   training a model for said source domain with said augmented data; and
   fine-tuning said model to derive a refined model for said target domain.

6. The method of claim 5 further comprising deriving a new model for said target domain after training said model for said source domain with said augmented data.

7. The method of claim 1 further comprising training a model for said source domain with said augmented data wherein said model comprises a DPM (Deformable Part Model).

8. The method of claim 7 further comprising fine-tuning said model to derive a refined model for said target domain.

9. The method of claim 7 further comprising deriving a new model for said target domain after training said model for said source domain with said augmented data, wherein a SVM (Support Vector Machine) is supplied to said new model for said target domain.

10. A system for training data augmentation, said system comprising:
at least one processor; and
a non-transitory computer-usable medium embodying computer program code, said computer-usable medium capable of communicating with said at least one processor, said computer program code comprising instructions executable by said at least one processor and configured for:
providing a source domain and a target domain;
augmenting data in said source domain with transformations utilizing characteristics learned from said target domain, wherein said characteristics include unlabeled images from said target domain;
employing augmented data from said source domain said transformations to improve image classification accuracy in said target domain or a new domain; and
determining at least one representative property of said target domain and said source domain utilizing an average of one property from a set of images and wherein said photometric transformation comprises an intensity clipping.

11. The system of claim 10 wherein said characteristics include image characteristics comprising: a geometric transformation, a photometric transformation, a resolution conversion, and nuisance transformations.

12. The system of claim 11 wherein said instructions are further configured for:
deriving source images from said source domain and target images from said target domain;
subjecting said source images and said target images to feature extraction operations; and
comparing results of said feature extraction operation and including said results with said transformations for augmenting said data in said source domain and wherein said resolution conversion comprises a high-resolution to a low-resolution and vice versa.

13. The system of claim 12 wherein said comparing said results further comprises comparing based on at least one of a visual examination and/or an automated process.

14. The system of claim 12 wherein said instructions are further configured for:
training a model for said source domain with said augmented data;
fine-tuning said model to derive a refined model for said target domain; and
deriving a new model for said target domain after training said model for said source domain with said augmented data.

15. The system of claim 10 wherein said instructions are further configured for training a model for said source domain with said augmented data wherein said model comprises a DPM (Deformable Part Model).

16. The system of claim 15 wherein said instructions are further configured for fine-tuning said model to derive a refined model for said target domain.

17. The system of claim 15 wherein said instructions are further configured for deriving a new model for said target domain after training said model for said source domain with said augmented data wherein a SVM (Support Vector Machine) is supplied to said new model for said target domain.

18. A system for training data augmentation, said system comprising:
at least one processor; and
a non-transitory computer-usable medium embodying computer program code, said computer-usable medium capable of communicating with said at least one processor, said computer program code comprising instructions executable by said at least one processor and configured for:
providing a source domain and a target domain;
augmenting data in said source domain with transformations utilizing characteristics learned from said target domain, wherein said characteristics include unlabeled images from said target domain;
employing augmented data from said source domain said transformations to improve image classification accuracy in a new domain;
determining at least one representative property of said target domain and said source domain utilizing an average of one property from a set of images and wherein said photometric transformation comprises an intensity clipping;
training a model for said source domain with said augmented data;
fine-tuning said model to derive a refined model for said target domain; and
deriving a new model for said target domain after training said model for said source domain with said augmented data wherein a SVM (Support Vector Machine) is supplied to said new model for said target domain.

* * * * *